Dec. 17, 1957  A. KMONK  2,816,393
BAIT DISPENSER
Filed Aug. 20, 1954
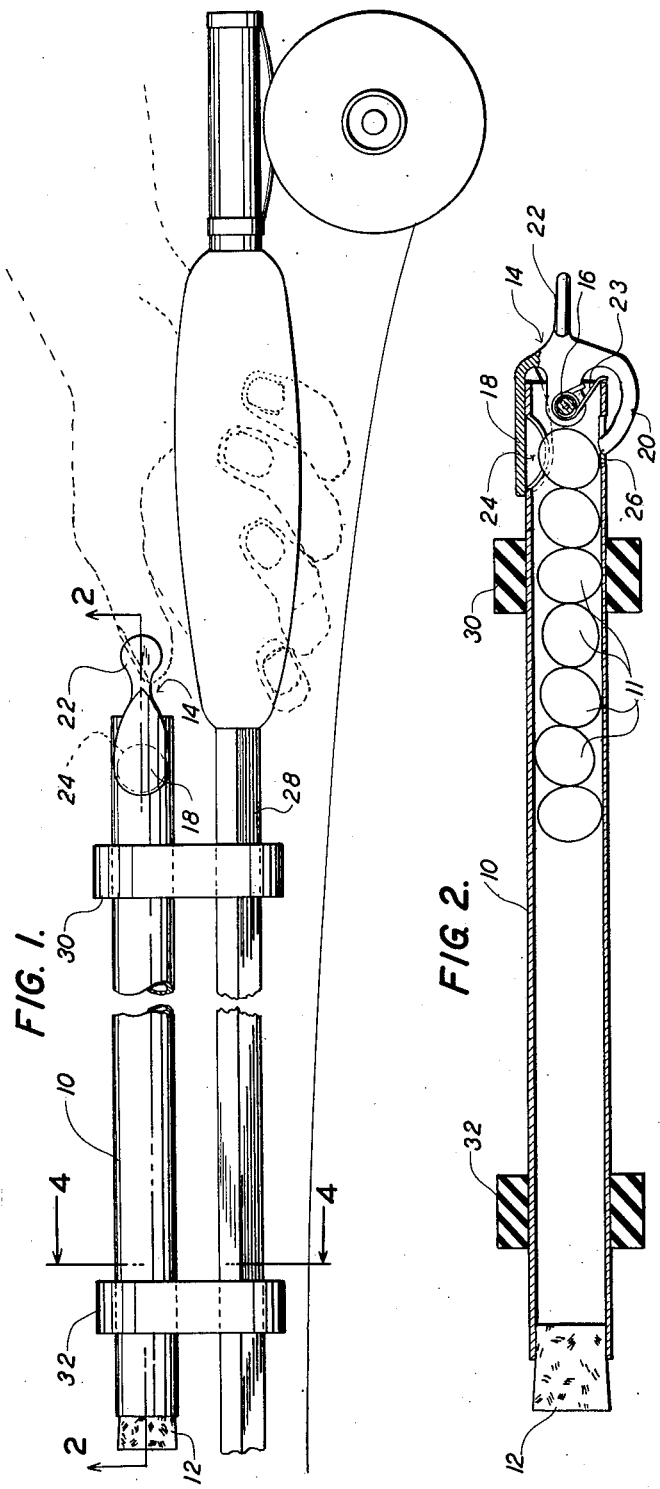
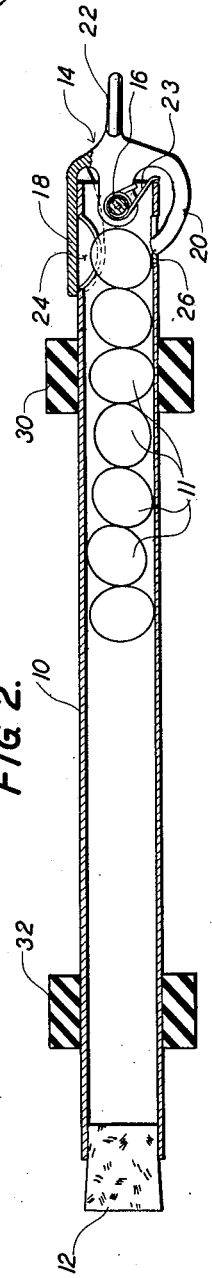
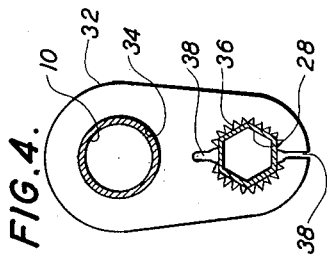
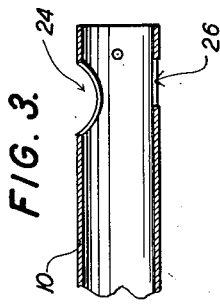
INVENTOR.
ANDREW KMONK United States Patent Office 2,816,393
Patented Dec. 17, 1957

2,816,393

BAIT DISPENSER

Andrew Kmonk, Rosemead, Calif.

Application August 20, 1954, Serial No. 451,152

2 Claims. (Cl. 43—55)

This invention relates to bait dispensers for use on fishing poles, and it has particular reference to a dispenser for salmon eggs.

Fisherman ordinarily carry salmon eggs in a closed container which is located in the fisherman's tackle box or pocket separate from the fishing pole. The container must be located and opened and then closed again each time that one or more salmon eggs are removed. Such an arrangement is cumbersome, and frequently salmon eggs are dropped into the water and lost because they are hard to remove from the container. This is particularly true if the fisherman is holding a fishing pole in one hand while he is removing the salmon egg with the other hand in order to bait his hook.

These difficulties are overcome in the present invention by providing a bait dispenser of light weight which may be mounted on a fishing pole without appreciably affecting the balance of the pole. The dispenser comprises a hollow cylindrical member of light weight having a removable closure located at one end of the member for use in inserting salmon eggs into the cylindrical member, and a trigger mechanism mounted at the other end of the cylindrical member for ejecting one salmon egg at a time. The trigger mechanism is provided with a lever which extends beyond the end of the cylindrical member so that the trigger mechanism may be actuated by operation of the lever by the thumb of the fisherman. The cylindrical member is mounted on the portion of a fishing pole just forward of the handle of the pole by resilient means. Preferably a pair of resilient members are employed for mounting the cylindrical member on the fishing pole, with each of the resilient members having a slotted opening for engaging the fishing pole when the fishing pole is forced into the slotted opening.

The invention is explained in detail with reference to the drawings, in which:

Fig. 1 shows the dispenser mounted on a fishing pole;

Fig. 2 is a sectional view along line 2—2 of Fig. 1 showing the dispenser with some salmon eggs in it;

Fig. 3 is a fragmentary sectional view of the end of the cylindrical member in which the trigger mechanism is located; and Fig. 4 is a sectional view along line 4—4 of Fig. 1.

The dispenser comprises a cylindrical member 10 having an inner diameter which is slightly greater than the diameter of the salmon eggs 11 which are to be dispensed from it. Preferably the cylindrical member is composed of lightweight material such as aluminum, plastic, or glass.

A removable closure such as the cork 12 is provided at one end of the cylindrical member for use in inserting salmon eggs into the member.

A trigger mechanism 14 is provided at the other end of the cylindrical member, and it serves to eject one salmon egg each time that it is actuated. The trigger mechanism is mounted on a shaft 16 which extends across the other end of the cylindrical member and the shaft provides a partial closure at that end of the cylindrical member.

The trigger mechanism is provided with a closure element 18, an ejector element 20, and a thumb piece or trigger element 22, all of which are fabricated in one piece so that various elements move in unison when the thumb piece is actuated. A spring 23 serves to maintain the trigger mechanism in its closed position except when it is actuated by movement of the thumb piece.

The cylindrical member is provided with a large opening 24 and a small opening 26 located in opposite sides of its body. The closure element 18 of the trigger mechanism provides a closure for the large opening, and the ejector element extends into the small opening so that it is disposed opposite the closure element.

The thumb piece extends beyond the cylindrical member so that it serves as a lever which can be actuated by the thumb of the fisherman while he is holding the fishing pole, to cause the closure element to move away from the large opening and to cause the ejector element to eject one salmon egg through the large opening each time that the thumb piece is moved.

The cylindrical member is mounted on a fishing pole 28 by a pair of resilient members 30 and 32. As illustrated in Fig. 4, each of the resilient members has an opening 34 for holding the cylindrical member, and each member also has an opening 36 for accommodating the fishing pole. Each opening 36 is provided with slotted portions 38 so that the cylindrical member may be pressed onto the fishing pole. Preferably, the resilient members 30 and 32 are composed of rubber.

The dispenser may be carried in a tackle box with ease, and it can be put into immediate use merely by pressing the resilient holders 30 and 32 onto the fishing pole at a location which is just forward of the handle of the pole. The dispenser is filled with salmon eggs by removing the cork and inserting the eggs one by one until the dispenser is filled. The eggs are ejected as needed by actuating the thumb piece.

The dispenser is in such a position on the fishing pole that the thumb of the fisherman may actuate the trigger mechanism without necessitating the removal of the fisherman's hand from the handle of the pole. The dispenser is of light weight and since it is mounted adjacent the handle of the fishing pole, it does not affect the balance of the pole appreciably.

The interior of the cylindrical member 10 may be cleaned with ease by merely removing the cork 12 and running water through the cylindrical member. The partial closure provided by the shaft 16 at the other end of the cylindrical member permits water to flow out that end of the cylindrical member.

The dispensers may be constructed in various sizes to accommodate salmon eggs of different sizes or to accommodate other types of bait of approximately spherical shape.

I claim:

1. A bait dispenser for use on a fishing pole comprising a hollow cylindrical member, a removable closure located at one end of the cylindrical member for use in inserting bait into the cylindrical member, the cylindrical member having a pair of openings located in opposite sides of its body adjacent the other end of the cylindrical member, a shaft mounted in the cylindrical member and extending across said other end of the cylindrical member to provide the primary closure therein, and a trigger mechanism pivoted on the shaft but otherwise located outside the cylindrical member and having a closure element, an ejector element and a trigger element all interconnected to move in unison, with the closure element providing a closure for one of the openings in the cylindrical member and the ejector element extending into the other opening in the cylindrical member and disposed opposite the closure element, and the trigger element extending beyond the end of the cylindrical member to be activated by the thumb of the fisherman so as to cause the closure element to move away from the opening which it engages and to cause the ejector element to eject one piece of bait through the opening which the closure element engages each time that the trigger mechanism is activated.

2. A bait dispenser for use on a fishing pole comprising a hollow cylindrical member, a removable closure located at one end of the cylindrical member for use in inserting bait into the cylindrical member, the cylindrical member having a large and a small opening located in opposite sides of its body adjacent the other end of the cylindrical member, a shaft mounted in the cylindrical member and extending across said other end of the cylindrical member to provide the primary closure therein, a trigger mechanism pivoted on the shaft but otherwise located outside the cylindrical member and having a closure element, an ejector element and a trigger element all interconnected to move in unison, with the closure element providing a closure for said large opening and the ejector element extending into said small opening and disposed opposite the closure element, the trigger element extending beyond the end of the cylindrical member and substantially along the axis of the cylindrical member to be activated by the thumb of the fisherman so as to cause the closure element to move away from the large opening and to cause the ejector element to eject one piece of bait through the large opening each time that the trigger mechanism is activated, and a spring attached to the trigger mechanism for urging it in a direction to cause the closure element to close the large opening through which the bait is dispensed.

References Cited in the file of this patent

UNITED STATES PATENTS

| 731,335 | Blanchet | June 13, 1903 |
| 1,519,018 | Boudreau | Dec. 9, 1924 |
| 1,778,952 | McCullough | Oct. 21, 1930 |
| 2,058,416 | Comstock | Oct. 27, 1936 |
| 2,191,782 | Valane | Feb. 27, 1940 |
| 2,443,861 | Johnston | June 22, 1948 |

FOREIGN PATENTS

| 975,863 | France | Oct. 17, 1950 |